(12) United States Patent
Francis et al.

(10) Patent No.: US 6,412,850 B1
(45) Date of Patent: Jul. 2, 2002

(54) VEHICLE AUXILIARY SUN VISOR ASSEMBLY

(76) Inventors: David Francis, 13401 Reliance St., Arleta, CA (US) 91331; Steven J. Bierend, 7533 Louise Ave., Van Nuys, CA (US) 91406; Albert O. Cota, 17475 Flanders St., Granada Hills, CA (US) 91344

( * ) Notice: Subject to any disclaimer, the term of this patent is extended or adjusted under 35 U.S.C. 154(b) by 0 days.

(21) Appl. No.: 09/901,172

(22) Filed: Jul. 10, 2001

Related U.S. Application Data
(60) Provisional application No. 60/224,875, filed on Aug. 14, 2000.

(51) Int. Cl.[7] .................................................. B60J 3/02
(52) U.S. Cl. ...................................................... 296/97.6
(58) Field of Search .............................. 296/97.1, 97.6, 296/97.8, 97.9, 97.12, 97.13, 97.11, 97.5, 97.2

(56) References Cited

U.S. PATENT DOCUMENTS

| | | | | |
|---|---|---|---|---|
| 3,201,170 A | * | 8/1965 | Weingarten | ................ 296/97.6 |
| 5,673,957 A | * | 10/1997 | Moo et al. | ................ 296/97.6 |
| 6,139,084 A | * | 10/2000 | Miles | ................ 296/97.6 |

FOREIGN PATENT DOCUMENTS

| | | | | |
|---|---|---|---|---|
| FR | 1132147 | * | 3/1957 | ................ 296/97.6 |
| FR | 2399332 | * | 4/1979 | ................ 296/97.6 |
| FR | 2559104 A | * | 8/1985 | ................ 296/97.6 |

* cited by examiner

*Primary Examiner*—Stephen T. Gordon
*Assistant Examiner*—Jason Morrow
(74) *Attorney, Agent, or Firm*—Albert O. Cota

(57) ABSTRACT

An auxiliary vehicle sun visor assembly (10) adapted to be attached to a conventional vehicle sun visor (150). The assembly (10) consists of a pivot rod (12) having a vertical section (14) and a contiguous horizontal section (30). Attached to the vertical section (14), by means of a set of vertical hinged brackets (42), is an inner edge (116) of an auxiliary visor (110). Attached to the horizontal section (30), by means of a set of horizontal hinged brackets (56), is a lower edge (114) of the auxiliary visor (110). The assembly (10) is designed to be placed and secured in a retraced, stowed position, against the surface of the vehicle sun visor, or to be rotated around the horizontal section (30) of the pivot rod (12) and placed in a downward position, or rotated around the vertical section (14) of the pivot rod (12) and placed in a side position.

11 Claims, 4 Drawing Sheets

VEHICLE AUXILIARY SUN VISOR ASSEMBLY

TECHNICAL FIELD

This application claims benefit to U.S. provisional application Serial No. 60/224,875, filed Aug. 14, 2000

The invention pertains generally to vehicle sun visors and more particularly to an auxiliary sun visor that is removably attached to the vehicle sun visor. The auxiliary sun visor can be moved from a retracted, stowed position to a lower position or a side position which block the sun's rays from the eyes of a driver or a passenger.

BACKGROUND ART

Previously, many types of sun visors have been used to provide an effective means for shading a vehicle's driver and passengers from the sun or other reflective sources. Most automobiles and trucks available today provide opaque sun visors as standard equipment. Prior art has attempted to extend the utility of these standard sun visors by adding a transparent auxiliary visor beneath or at the side of the existing visors. The reason for this addition is that while most visors typically perform adequately, it is sometimes desirable to possess a tinted transparent visor through which a driver may see but that can also reduce intense light and bright glare.

Attempts to achieve this utility have included clip-on glare screens that pivot or slide downward beneath the visor. Other devices position a screen inside the visor which can be pulled down, or add a side section that can slide horizontally from the visor. These basic attempts fill some of the need, however, they are for the most part unsightly or too complex in construction and operation to be satisfactory to the vast majority of users.

A search of the prior art did not disclose nay patents that read directly on the claims of the instant invention, however the following U.S. patents are considered related:

| U.S. PAT. NO. | INVENTOR | ISSUED |
| --- | --- | --- |
| 4,323,275 | Lutz | April 6, 1982 |
| 4,792,176 | Karford | December 20, 1988 |
| 5,472,255 | Moore | December 5, 1995 |

The U.S. Pat. No. 4,323,275 discloses a housing attached to a visor with three auxiliary shields that may be withdrawn from slots in the visor.

The U.S. Pat. No. 4,792,176 discloses a visor extension unit that is releasably attachable to a standard sun visor. The unit includes a lateral visor extension panel which is movable through a horizontal guide passage in the visor extension unit so as to effectively increase the windshield area blocked on either side of the sun visor. A glare shield is movable through a separate pocket formed in the extension unit.

The U.S. Pat. No. 5,472,255 discloses a sun visor which has a retractable sun screen. The screen is folded or rolled up into the visor for deployment beside the front window as well as the windshield.

For background purposes and as indicative of the art to which the invention relates reference may be made to the remaining cited patents.

| U.S. PAT. NO. | INVENTOR | ISSUED |
| --- | --- | --- |
| 5,580,117 | Goclowski | December 3, 1996 |
| 5,466,029 | Zetterlund | November 14, 1995 |
| 4,986,139 | Yamada | January 29, 1991 |

DISCLOSURE OF THE INVENTION

In its most basic design, the vehicle auxiliary sun visor assembly is comprised of a pivot rod having a vertical section and a contiguous horizontal section. The assembly also comprises an auxiliary visor which has an upper edge, a lower edge, an inner edge and an outer edge. There are at least two vertical hinged brackets which have means for being rotatably attached to the vertical section of the pivot rod, and means for being rigidly attached to the inner edge of the auxiliary visor. Additionally, there are at least two horizontal hinged brackets which have means for being rotatably attached to the horizontal section of the pivot rod, and means for being rigidly attached to the vehicle sun visor.

The auxiliary vehicle sun visor assembly is designed to be rotatably placed and secured in a stowed position, or the assembly can be rotated around the horizontal section of the pivot rod to be placed in a downward position, which would cause the auxiliary visor to be directly in front of a person using the assembly. If desired, the assembly can also be rotated around the vertical section of the pivot rod and placed in a side position, which would cause the auxiliary visor to be located to the left of a driver. The assembly can also be attached to the vehicle sun visor located on the passenger side. This is accomplished by removing the horizontal hinged brackets from the horizontal section of the pivot rod, rotating the brackets 180°, and re-inserting the brackets into the horizontal rod.

In view of the above disclosure, the primary object of the invention is to provide additional sun/glare blocking ability to conventional vehicle sun visors. Whereas a conventional visor can only block the area above the lowest plane of the visor, the auxiliary vehicle sun visor can causes the area that is blocked to significantly increase, thereby allowing better visibility when needed.

It is also an object to provide an auxiliary vehicle sun visor that:

- is easy to install and use as an after market vehicle product,
- can be made in a variety of sizes to fit different vehicles,
- can be used on either a driver's-side sun visor or a passenger's side sun visor,
- is maintenance free, and only requires occasional wiping to clean,
- can be quickly removed and placed in another vehicle,
- can provide a substantial amount of additional safety for drivers/passengers and pedestrians/other vehicles on the road,
- is cost effective from both a manufacturer's and consumer's point of view, and
- can be easily packaged, transported and displayed for sale.

BEST MODE FOR CARRYING OUT THE INVENTION

Figure 1:
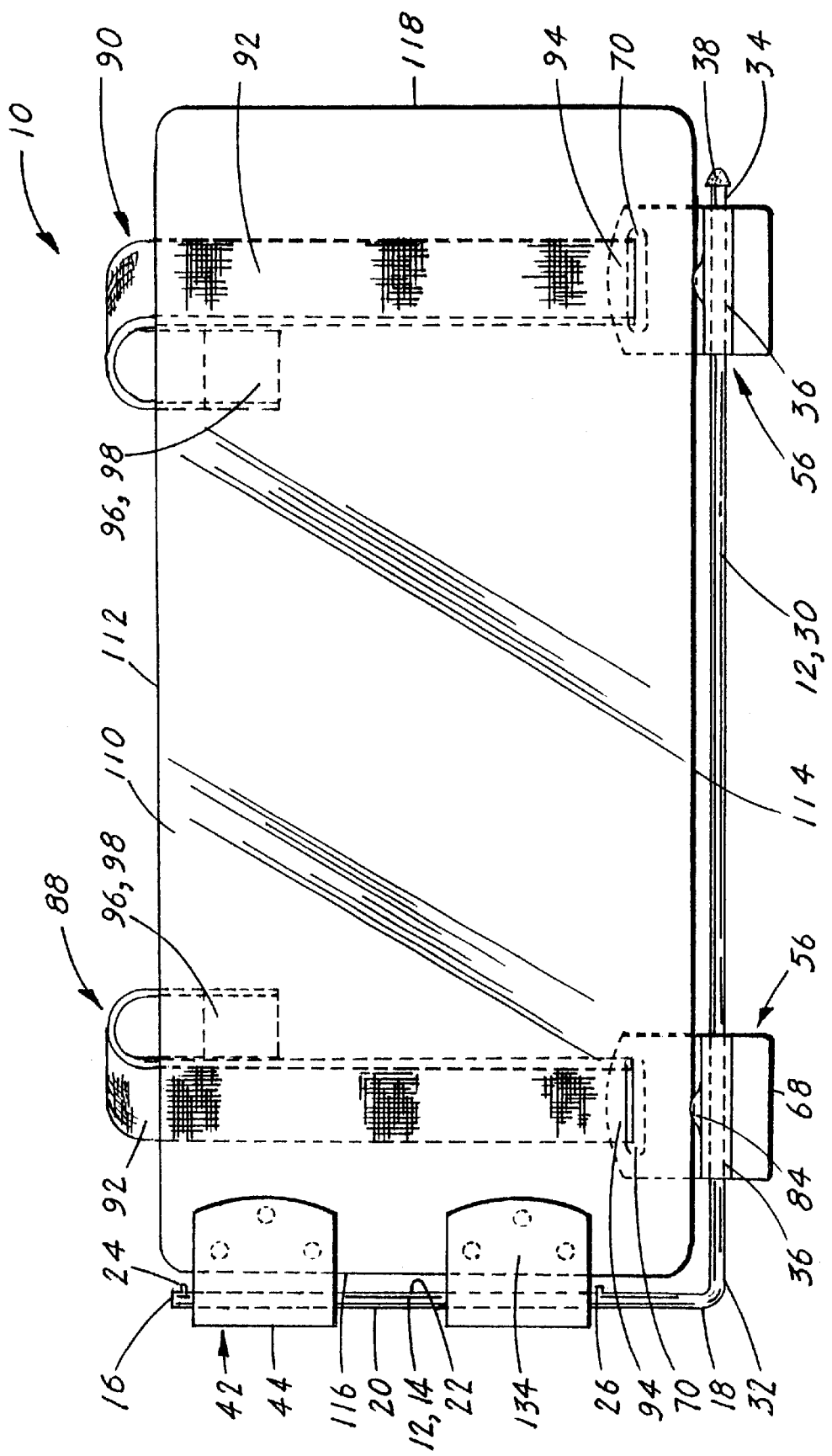
FIG. 1 is a front elevational view of an auxiliary vehicle sun visor assembly.
Figure 2:
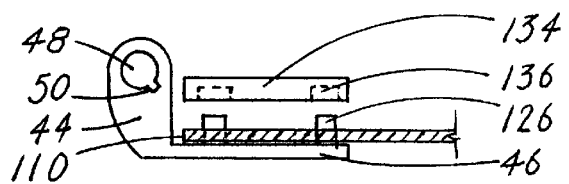
FIG. 2 is a top plan view of a vertical hinged bracket showing the relative position of the outer rod attachment section, the inner auxiliary visor attachment tab and the inner view attachment cap.
Figure 5:
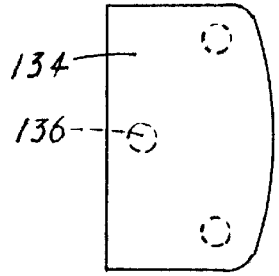
FIG. 5 is a top plan view of the inner visor attachment cap.
Figure 3:
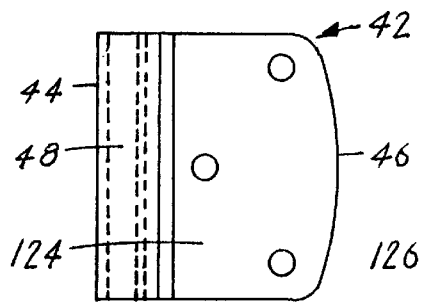
FIG. 3 is a front elevational view of the vertical hinged bracket.

The best mode of thee invention is presented in terms of a preferred embodiment for an auxiliary vehicle sun visor 10, (hereinafter "assembly 10") which is designed to be attached to a conventional vehicle sun visor 150 to provide additional protection from the sun or glare.

The assembly 10, as shown in FIGS. 1–11, is comprised of the following major elements: a pivot rod 12, a set of vertical hinged brackets 42, a set of horizontal hinged brackets 56, an inner strap assembly 88, an outer strap assembly 90 and an auxiliary visor 110.

As shown in FIG. 1, the assembly 10 is comprised of the pivot rod 12, which comprises a vertical section 14 having a first end 16, a second end 18, an outer surface 20 and an inner surface 22. From the inner surface 22 extends outward an upper stop pin 24 and a lower stop pin 26. A horizontal section 30, as also shown in FIG. 1, has a first end 32 and a second end 34. The first end 32 is contiguous with the second end 18 of the vertical section 14. Located along the second end 34 are at least two sections having a larger cross-section 36, as shown in FIG. 1 that allow the horizontal hinged brackets to remain fixed in-place. The second end, as shown in FIG. 1, can also be dimensioned to receive an end cap 38 which eliminates a relatively sharp point and adds to the aesthetics of the assembly 10.

There are at least two vertical hinged brackets 42, wherein each bracket has an outer rod attachment section 44 and an inner auxiliary visor attachment tab 46, as shown in FIGS. 1 and 2–4. The Outer rod attachment section 44 has a rod bore 48 therethrough that is dimensioned to rotatably accept the vertical section 14 of the pivot rod 12. The rod bore 48 incorporates a pin slot 50 therethrough, as shown best in FIG. 2, that is dimensioned to accept the upper and lower stop pins 24, 26 on the vertical section 14 of the pivot rod 12.

Figure 6:
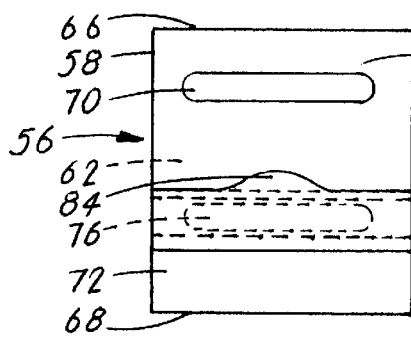
FIG. 6 is a rear elevational view of the horizontal hinged bracket.
Figure 7:
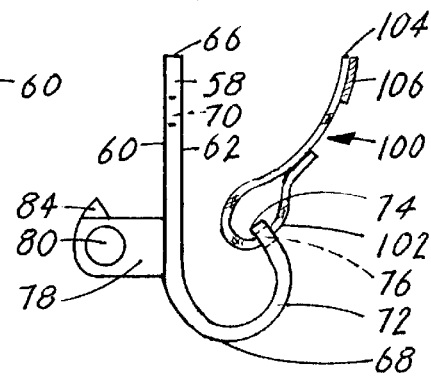
FIG. 7 is a right side elevational view of the horizontal hinged bracket. The left side elevational view is a mirror image thereof.
Figure 8:
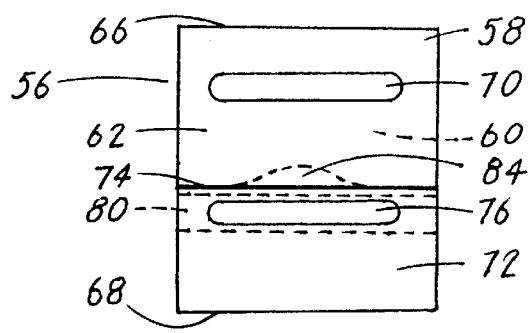
FIG. 8 is a front elevational view of the horizontal hinged bracket.

As shown in FIGS. 1 and 6–8, there are at least two horizontal hinged brackets 56. Each hinged bracket 56 consists of a vertical tab 58 having an inner surface 60, an outer surface 62, an upper edge 66 and a lower edge 68. The upper edge 66 has adjacent thereto a front strap slot 70, as shown best in FIG. 6, and the lower edge 68 terminates in an outward-extending, vehicle visor clip 72 having an upper edge 74 and having adjacent thereto a rear strap slot 76, as best shown in FIG. 8.

As best shown in FIGS. 6 and 7, a horizontal rod traversing structure 78 extends outward from the inner surface 60 of the vertical tab 58. The structure 78 incorporates a rod bore 80 and an upper surface 82 from where extends upward an auxiliary visor holding tab 84.

The assembly 10 further comprises the inner strap assembly 88 and the outer strap assembly 90, as shown in FIGS. 1 and 9–11. Each strap assembly 88, 90 is comprised of a front strap 92 and a rear strap 100. The front strap 92 has a first end 94 that is inserted into and attached to the front strap slot 70, and a second end 96 having attached thereto a first surface of a hook and loop fastener 98. The rear strap 100, as shown in FIG. 7, has a first end 102 inserted into and attached to the rear strap slot 76, and a second end 104 having attached thereto a second surface of a hook and loop fastener 106.

Figure 9:
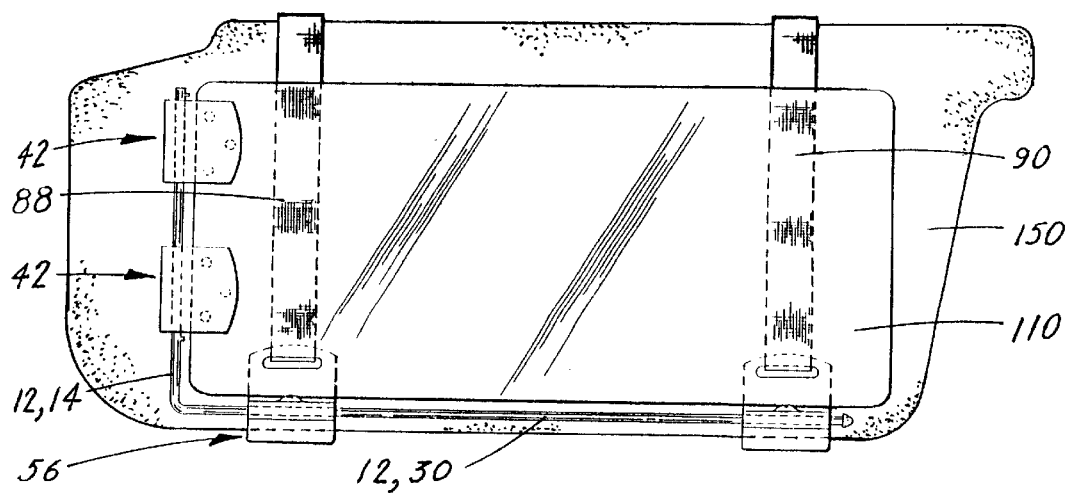
FIG. 9 is a front elevational view of the auxiliary vehicle sun visor assembly strapped to a conventional vehicle sun visor and placed in a retracted, stowed position.
Figure 10:
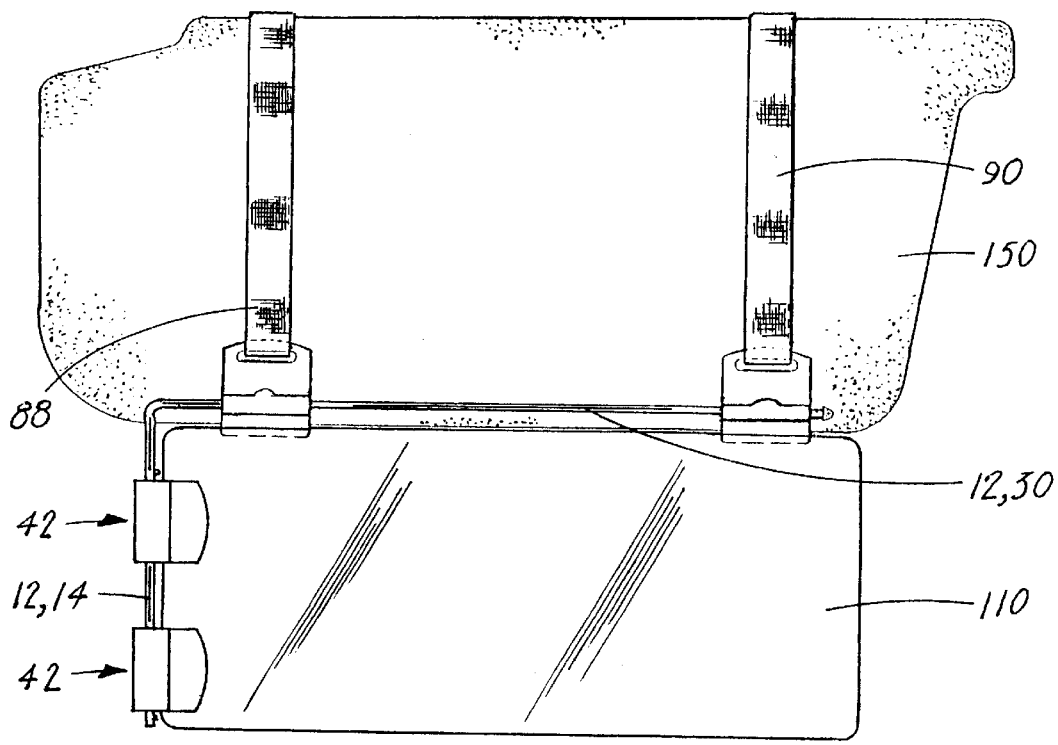
FIG. 10 is a front elevational view of the auxiliary vehicle sun visor assembly strapped to a conventional vehicle sun visor and placed in a downward position.
Figure 11:
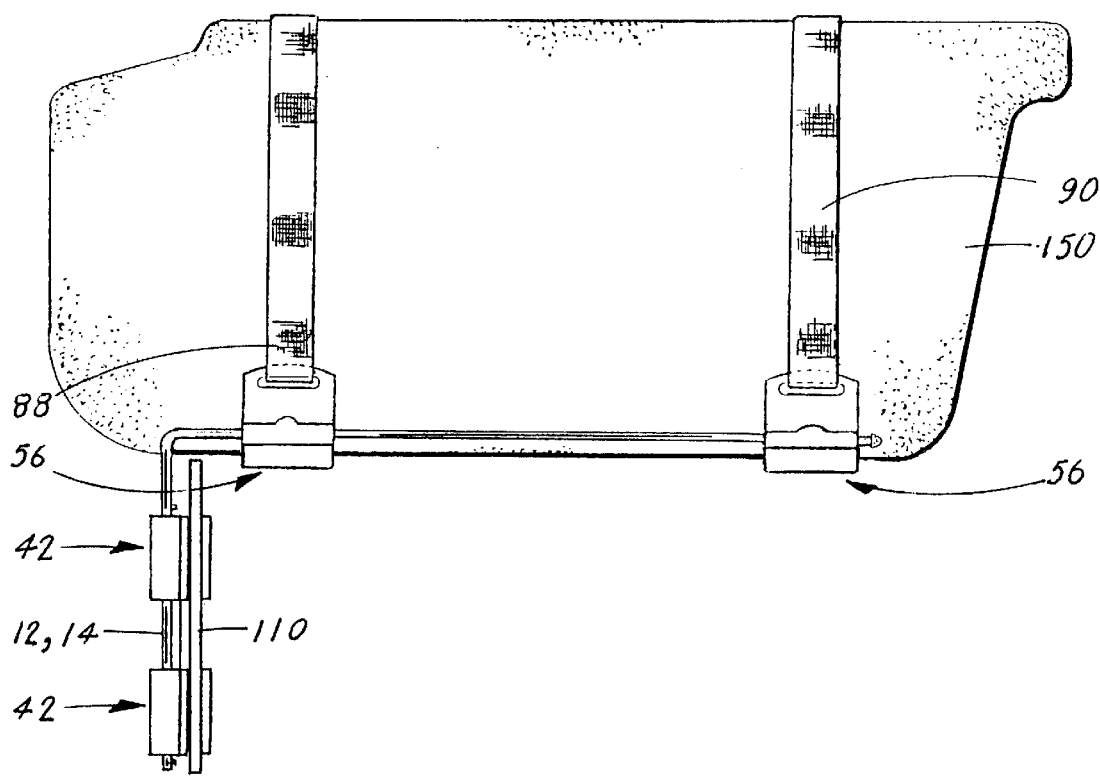
FIG. 11 is a front elevational view of the auxiliary vehicle sun visor assembly strapped to a conventional vehicle sun visor and placed in a downward and side position.

As shown in FIG. 1, the auxiliary visor 110, which is preferably made of a tinted acrylic plastic, has an upper edge 112, a lower edge 114, an inner edge 116, and an outer edge 118. The inner edge 116 is attached by an attachment means to the at least two vertical hinged brackets 42. When the inner and outer strap assemblies 89, 90 are wrapped and tightened around the vehicle sun visor 150, the auxiliary visor 110 is attached, as shown. in FIGS. 9, 10 and 11. Once attached, the auxiliary visor 110 can be rotatably placed and secured in a stowed position, as shown in FIG. 9, by placing the lower edge 114 of the auxiliary visor 110 into each of the auxiliary visor holding tabs 84. The auxiliary sun visor can also be rotated around the horizontal section 30 of the pivot rod 12 to be Placed in a downward position, as shown in FIG. 10, or rotated around the vertical section 14 of the pivot rod 12 and placed in a side position, as shown in FIG. 11.

Figure 4:
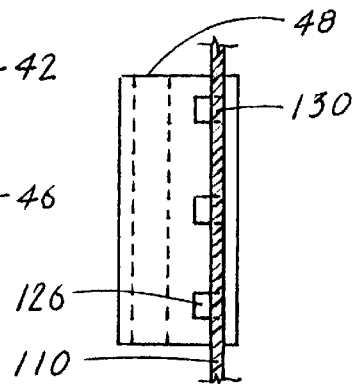
FIG. 4 is a right side elevational view of the vertical hinged bracket.

The attachment means 120 for attaching the inner edge 116 of the auxiliary visor 110 to the at least two vertical hinged brackets 42 comprises the inner auxiliary visor attachment tabs 46 further having an inner surface 124 from where extends upward a set of visor attachment pins 126. The auxiliary visor 110 has adjacent its inner edge 116. a set of pin bores 130, as shown in FIG. 1, that are in alignment with the visor attachment pins 126. When the pin bores 130 are inserted over the visor attachment pins 126, the pins protrude above the surface of the auxiliary visor 110, as shown in FIG. 4.

An inner visor attachment cap 134 has a set of pin cavities 136 that are in alignment with the visor attachment pins 126. The pin cavities 136 are dimensioned to allow a friction fit when pressed into the visor attachment pins 126, at which time the auxiliary visor 110 is attached.

While the invention has been described in complete detail and pictorially shown in the accompanying drawings it is not to be limited to such details, since many changes and modifications may be made in the invention without departing from the spirit and scope thereof. Hence, it is described to cover any and all modifications and forms which may come within the language and scope of the appended claims.

What is claimed is:

1. An auxiliary vehicle sun visor assembly adapted to be attached to a conventional vehicle sun visor, said auxiliary vehicle sun visor comprises:

a) a pivot rod having a vertical section and a contiguous horizontal section, wherein, said vertical section further comprises an upper stop pin and a lower stop pin, b) an auxiliary visor having an upper edge, a lower edge, an inner edge and an outer edge, c) at least two vertical hinged brackets attached to the vertical section of said pivot rod by: said vertical hinged bracket further having an outer rod attachment section having a rod bore therethrough that is dimensioned to rotatably accept the vertical section of said pivot rod, with said rod bores further having a pin slot therethrough that is dimensioned to accept the upper and lower stop pins located on the vertical section of said pivot rod, d) means for being rigidly attached to the inner edge of said auxiliary visor, and e) at least two horizontal hinged brackets having means for being rotatably attached to the horizontal section of said pivot rod and means for being rigidly attached to the vehicle sun visor wherein said assembly is designed to be rotatably placed and secured in a retracted, stowed position, being rotated around the horizontal section of said pivot rod to be placed in a downward position or be rotated around the vertical section of said pivot rod to be placed in a side position.

2. The assembly as specified in claim 1 wherein said means for rigidly attaching each of said at least two vertical hinged brackets to the inner edge of said auxiliary visor comprises:

a) said at least two vertical hinged brackets each further having an inner auxiliary visor attachment tab further having an inner surface from where extends upward a set of visor attachment pins, b) said auxiliary visor having adjacent its inner edge a set of pin bores in alignment with the visor attachment pins, wherein when the pin bores are inserted over the visor attachment pins, the pins protrude above the surface of said auxiliary visor, and c) an inner visor attachment cap having a set of pin cavities in alignment with the visor attachment pins, wherein the pin cavities are dimensioned to allow a friction fit when pressed into the visor attachment pins at which time said auxiliary visor is attached.

3. An auxiliary vehicle sun visor assembly adapted to be attached to a conventional vehicle sun visor, said auxiliary vehicle sun visor comprises:

a) a pivot rod having a vertical section and a contiguous horizontal section, wherein, the horizontal section further comprises at least two sections having a larger cross-section which allow at least two horizontal hinged brackets to remain fixed in-place, b) an auxiliary visor having an upper edge, a lower edge, an inner edge and an outer edge, c) at least two vertical hinged brackets attached to the vertical section of said pivot rod and means for being rigidly attached to the inner edge of said auxiliary visor, and d) the least two horizontal hinged brackets having means for being rotatably attached to the horizontal section of said pivot rod and means for being rigidly attached to the vehicle sun visor wherein said assembly is designed to be rotatably placed and secured in a retracted, stowed position, being rotated around the horizontal section of said pivot rod to be placed in a downward position or be rotated around the vertical section of said pivot rod to be placed in a side position.

4. The assembly as specified in claim 3 wherein said means for rotatably attaching each of said at least two horizontal hinged brackets to the horizontal section of said pivot rod comprises:

a) said at least two horizontal hinged brackets each further having:

(1) a vertical tab having an inner surface, an outer surface, an upper edge having adjacent thereto a front strap slot, and a lower edge terminating in an outward-extending, vehicle visor clip having an upper edge and having adjacent thereto a rear strap slot, and (2) a horizontal rod traversing structure extending outward from the inner surface of the vertical tab and having a rod bore and an upper surface from where extends upward an auxiliary visor holding tab, wherein the rod bore is dimensioned to rotatably accept the horizontal section of said pivot rod to provide the means for rotatably attaching each of said horizontal hinged brackets to said pivot rod, wherein when said horizontal hinged brackets are inserted over the larger cross-section of the horizontal rod, the at least two horizontal brackets are firmly held in place.

5. The assembly as specified in claim 4 wherein said means for rigidly attaching said horizontal hinged brackets to the vehicle sun visor comprises an inner strap assembly and an outer strap assembly wherein each strap assembly comprises:

a) a front strap having a first end that is inserted into and attached to the front strap slot and a second end having attached thereto a first surface of a hook and loop fastener, and b) a rear strap having a first end inserted into and attached to the rear strap slot and a second end having attached thereto a second surface of a hook and loop fastener, wherein when said front and rear strap assemblies are wrapped and tightened around said vehicle sun visor, said auxiliary sun visor is attached.

6. The assembly as specified in claim 4 wherein the horizontal rod traversing structure further comprises an auxiliary visor holding tab which is positioned and dimensioned to allow the lower edge of the auxiliary sun visor to be inserted thereon to secure the auxiliary sun visor in the stowed position.

7. An auxiliary vehicle sun visor assembly adapted to be attached to a conventional vehicle sun visor, said auxiliary vehicle sun visor comprising:

a) a pivot rod comprising:

(1) a vertical section having a first end, a second end, an outer surface and an inner surface, wherefrom the inner surface extends outward an upper stop pin and a lower stop pin, and (2) a horizontal section having a first end and a second end, wherein the first end is contiguous with the second and of the vertical section, and wherein along the second end are located at least two sections having a larger cross-section, b) at least two vertical hinged brackets, wherein each bracket has an outer rod attachment section and an inner auxiliary visor attachment tab, wherein the rod attachment section having a rod bore therethrough that is dimensioned to rotatably accept the vertical section of said pivot rod, wherein said rod bore further having a pin slot therethrough that is dimensioned to accept the upper and lower stop pins located on the vertical section of said pivot rod, c) at least two horizontal hinged brackets, wherein each bracket comprises:
  (1) a vertical tab having an inner surface, an outer surface, an upper edge having adjacent thereto a front strap slot, a lower edge that terminates in an outward-extending, vehicle visor clip having an upper edge and having adjacent thereto a rear strap slot, and
  (2) a horizontal rod traversing structure extending outward from the inner surface of the vertical tab and having a rod bore and an upper surface from where extends upward an auxiliary visor holding tab,
d) an inner strap assembly and an outer strap assembly, wherein each strap assembly comprises:
  (1) a front strap having a first end that is inserted into and attached to the front strap slot and a second end having attached thereto a first surface of a hook and loop fastener,
  (2) a rear strap having a first end that is inserted into and attached to the rear strap slot and a second end having attached thereto a second surface of a hook and loop fastener, and
e) an auxiliary visor having an upper edge, a lower edge, an inner edge, and an outer edge, wherein the inner edges are attached, by an attachment means, to said at least two vertical hinged brackets, wherein when said inner and outer strap assemblies are wrapped and tightened and fastened around said vehicle sun visor, said auxiliary vehicle sun visor is attached, at which time said auxiliary vehicle sun visor can be rotatably placed and in a retracted, stowed position and secured by placing the lower edge of the auxiliary visor into each of the auxiliary visor holding tabs, or can be rotated around the horizontal section of said pivot rod to be positioned in a downward position, or rotated around the vertical section of said pivot rod and placed in a side position.

8. The assembly as specified in claim 7 wherein said means for attaching the inner edge of said auxiliary visor to said at least two vertical hinged brackets comprises:
  a) the inner auxiliary visor attachment tab further having an inner surface from where extend upward a set of visor attachment pins,
  b) said auxiliary visor having adjacent its inner edge a set of pin bores in alignment with the visor attachment pins, wherein when the pin bores are inserted over the visor attachment pins, the pins protrude above the surface of said auxiliary visor, and
  c) an inner visor attachment cap having a set of pin cavities in alignment with the visor attachment pins, wherein the pin cavities are dimensioned to allow a friction fit when pressed into the visor attachment pins at which time said auxiliary visor is attached.

9. The assembly as specified in claim 7 further comprising an end cap that is dimensioned to fit into the second end of the horizontal rod of said pivot rod.

10. The assembly as specified in claim 7 wherein said pivot rod, said vertical hinged brackets and said horizontal hinged brackets are made in a color to compliment the interior color of the vehicle.

11. The assembly as specified in claim 7 wherein the auxiliary visor is made of a tinted acrylic plastic.

* * * * *